(12) United States Patent
Allard et al.

(10) Patent No.: US 11,874,053 B2
(45) Date of Patent: Jan. 16, 2024

(54) VACUUM INSULATED DOOR STRUCTURE FOR AN APPLIANCE INCORPORATING A DISPENSER STRUCTURE

(71) Applicant: WHIRLPOOL CORPORATION, Benton Harbor, MI (US)

(72) Inventors: Paul B. Allard, Coloma, MI (US); Sarah Galea, St. Joseph, MI (US); Dustin M. Miller, South Bend, IN (US); Vikas C. Mruthyunjaya, St. Joseph, MI (US); Abhay Naik, Stevensville, MI (US); Sanjesh Kumar Pathak, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/874,591

(22) Filed: Jul. 27, 2022

(65) Prior Publication Data

US 2022/0364784 A1 Nov. 17, 2022

Related U.S. Application Data

(62) Division of application No. 17/130,554, filed on Dec. 22, 2020, now Pat. No. 11,435,130, which is a
(Continued)

(51) Int. Cl.
*F25D 23/02* (2006.01)
*F25C 5/20* (2018.01)
(Continued)

(52) U.S. Cl.
CPC .............. *F25D 23/028* (2013.01); *F25C 5/22* (2018.01); *F25D 23/04* (2013.01); *F25D 23/066* (2013.01);
(Continued)

(58) Field of Classification Search
CPC ...... F25D 23/028; F25D 23/04; F25D 23/066; F25D 23/126; F25C 5/22; F25C 2400/10
See application file for complete search history.

(56) References Cited

U.S. PATENT DOCUMENTS 1,429,649 A * 9/1922 Simons ................. F25D 23/065
62/422
1,630,065 A * 5/1927 Leonard ............... F25D 23/065
62/417
(Continued)

FOREIGN PATENT DOCUMENTS

CN         1196118 A    10/1998
CN       102269498 A    12/2011
(Continued)

*Primary Examiner* — James O Hansen
(74) *Attorney, Agent, or Firm* — Price Heneveld LLP

(57) ABSTRACT

A door panel for a refrigerating appliance includes an inner liner. An outer wrapper is attached to the inner liner and defines an insulating structure with an insulating cavity disposed therein. An insulating material is defined within the insulating cavity. A dispenser structure is defined within a central portion of the inner liner and the outer wrapper. The dispenser structure defines an insulated dispenser portion therein. A dispenser conduit extends from an interior area disposed above the dispenser structure to an external dispensing cavity and passing through the insulated dispenser portion.

8 Claims, 7 Drawing Sheets

Related U.S. Application Data division of application No. 16/221,997, filed on Dec. 17, 2018, now Pat. No. 10,907,882.

(51) Int. Cl.
*F25D 23/04* (2006.01)
*F25D 23/06* (2006.01)
*F25D 23/12* (2006.01)

(52) U.S. Cl.
CPC ........ *F25D 23/126* (2013.01); *F25C 2400/10* (2013.01)

(56) References Cited

U.S. PATENT DOCUMENTS

| | | | |
|---|---|---|---|
| 1,999,839 A * | 4/1935 | Lambert | F25D 17/04 |
| | | | 62/413 |
| 3,177,271 A * | 4/1965 | Slayman | F25D 23/064 |
| | | | 264/46.7 |
| 5,359,795 A | 11/1994 | Mawby et al. | |
| 6,003,734 A | 12/1999 | Oh | |
| 7,155,923 B2 | 1/2007 | Nam et al. | |
| 8,230,647 B2 | 7/2012 | Cho et al. | |
| 8,607,585 B2 | 12/2013 | Jang et al. | |
| 9,038,403 B2 | 5/2015 | Cur et al. | |
| 9,151,536 B2 | 10/2015 | Buchstab et al. | |
| 9,310,123 B2 | 4/2016 | Guarino et al. | |
| 10,052,819 B2 | 8/2018 | Wu | |
| 2003/0008100 A1 | 1/2003 | Horn | |
| 2004/0183414 A1 | 9/2004 | Kwon | |
| 2011/0290808 A1 | 12/2011 | Bai et al. | |
| 2015/0040604 A1 | 2/2015 | You et al. | |
| 2015/0241112 A1 | 8/2015 | Wu | |
| 2015/0241114 A1 | 8/2015 | Wu | |
| 2016/0258671 A1 * | 9/2016 | Allard | F25D 23/085 |
| 2016/0265836 A1 | 9/2016 | Tong et al. | |
| 2017/0184340 A1 * | 6/2017 | Allard | B29C 45/1642 |
| 2018/0087826 A1 | 3/2018 | Hosamani et al. | |

FOREIGN PATENT DOCUMENTS

| | | |
|---|---|---|
| EP | 2339277 | 6/2011 |
| EP | 2348268 | 7/2011 |
| EP | 2770280 | 8/2014 |
| EP | 2936012 | 10/2015 |
| EP | 3346213 | 7/2018 |
| KR | 20050024699 A | 3/2005 |
| WO | 2010052650 A2 | 5/2010 |
| WO | 2018151704 | 8/2018 |

* cited by examiner

VACUUM INSULATED DOOR STRUCTURE FOR AN APPLIANCE INCORPORATING A DISPENSER STRUCTURE

CROSS-REFERENCE TO RELATED APPLICATION

The present application is a divisional of U.S. patent application Ser. No. 17/130,554 filed Dec. 22, 2020, entitled VACUUM INSULATED DOOR STRUCTURE FOR AN APPLIANCE INCORPORATING A DISPENSER STRUCTURE, now U.S. Pat. No. 11,435,130, which is divisional of U.S. patent application Ser. No. 16/221,997 filed Dec. 17, 2018, entitled VACUUM INSULATED DOOR STRUCTURE FOR AN APPLIANCE INCORPORATING A DISPENSER STRUCTURE, now U.S. Pat. No. 10,907,882, the entire disclosures of which are hereby incorporated herein by reference.

FIELD OF THE DEVICE

The device is in the field of vacuum insulated structures for appliances, and more specifically, a vacuum insulated structure for a door of an appliance that incorporates a structure for dispensing water and ice.

SUMMARY

In at least one aspect, a door panel for a refrigerating appliance includes an inner liner. An outer wrapper is attached to the inner liner and defines an insulating structure with an insulating cavity disposed therein. An insulating material is defined within the insulating cavity. A dispenser structure is defined within a central portion of the inner liner and the outer wrapper. The dispenser structure defines an insulated dispenser portion therein. A dispenser conduit extends from an interior area disposed above the dispenser structure to an external dispensing cavity and passing through the insulated dispenser portion.

In at least another aspect, a door panel for a refrigerating appliance includes an inner liner coupled with an outer wrapper and defining an insulating cavity therein. An interior perimeter is defined within the outer wrapper. An insulating material is defined within the insulating cavity. The insulating cavity defines an at least partial vacuum. A dispenser structure is disposed proximate the interior perimeter. The dispenser structure defines an insulated dispenser portion therein. The dispenser structure further defines an external dispensing cavity defined within the interior perimeter and extending rearward of the interior perimeter. A dispenser conduit extends from an interior area disposed above the dispenser structure to the external dispensing cavity and passing through the insulated dispenser portion.

In at least another aspect, a method for forming a door panel for an appliance includes forming a vacuum insulated structure having an inner liner, an outer wrapper and a sealed internal aperture extending through the inner liner and the outer wrapper. A dispensing assembly is attached to the vacuum insulated structure at the sealed internal aperture. The sealed internal aperture includes a plurality of attachment tabs that extend from each of the inner liner and the outer wrapper. The dispensing assembly is secured to the plurality of attachment tabs via mechanical fasteners. The plurality of attachment tabs includes fastener receptacles that receive a corresponding fastener and maintain the corresponding fastener separate from an insulating cavity of the vacuum insulated structure.

These and other features, advantages, and objects of the present device will be further understood and appreciated by those skilled in the art upon studying the following specification, claims, and appended drawings.

DETAILED DESCRIPTION OF EMBODIMENTS

Figure 1:
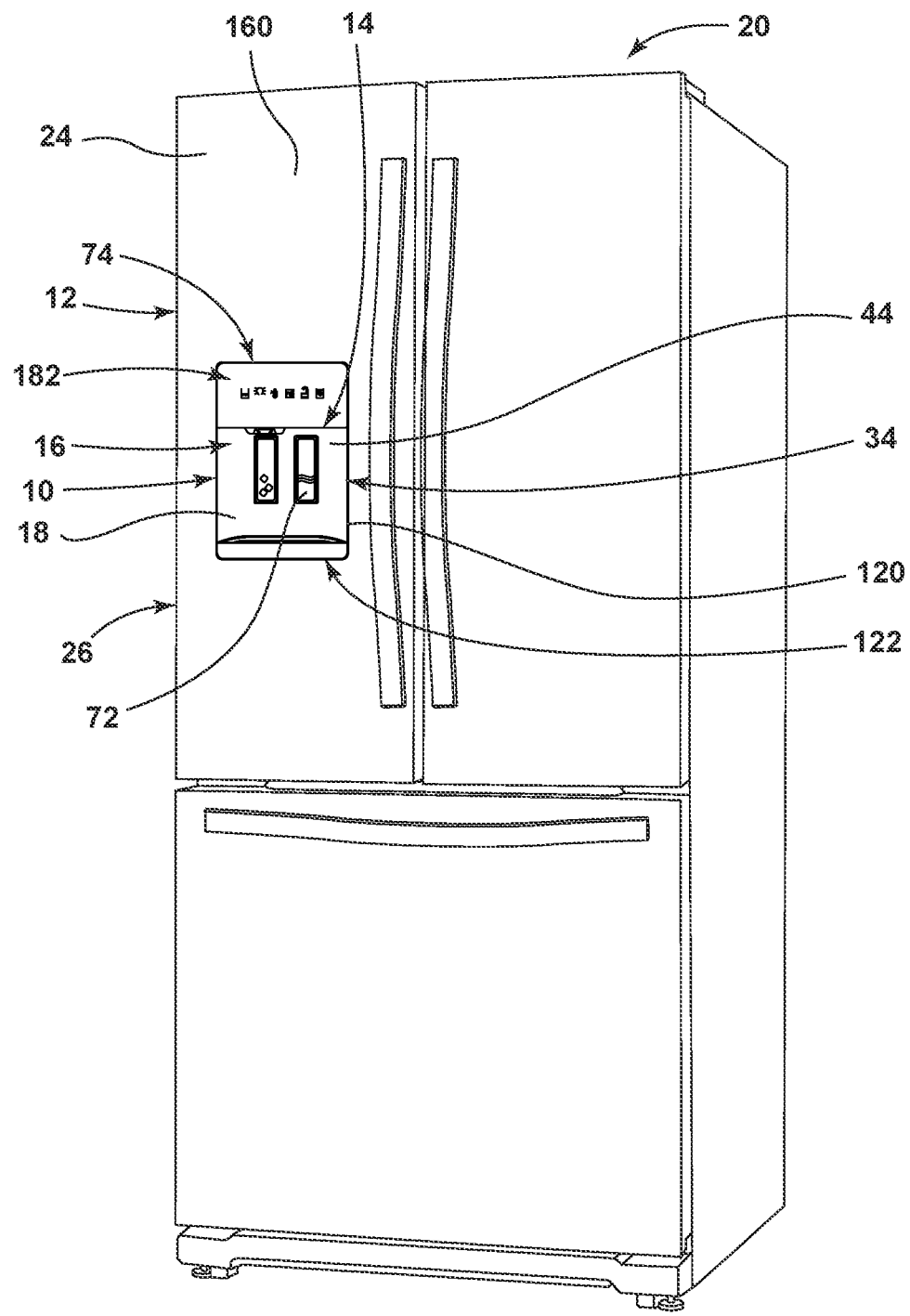
FIG. 1 is a front perspective view of an appliance incorporating an aspect of the vacuum insulated door incorporating the dispenser structure.
Figure 2:
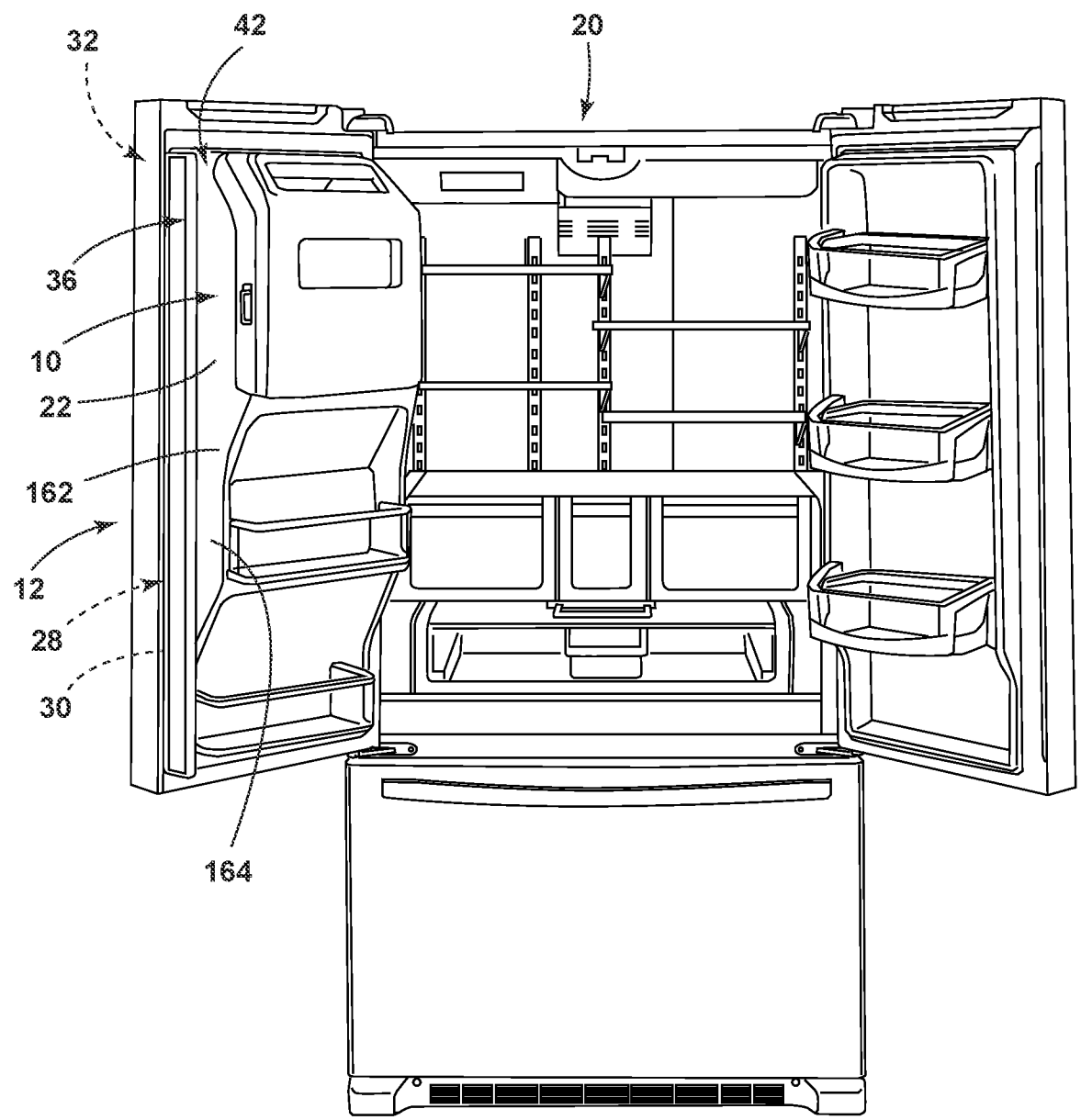
FIG. 2 is a front perspective view of the appliance of FIG. 1 showing the doors in an open position.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-7, reference numeral 10 generally refers to a dispenser structure that can be incorporated as part of a vacuum insulated door panel 12, where the dispenser structure 10 can at least partially receive a water dispensing assembly 14 and an ice making assembly 16. The dispenser structure 10 also includes a path through which water and ice pieces can be dispensed into a dispenser well 18.

According to various aspects of the device, as exemplified in FIGS. 1-7, a door panel 12 for a refrigerating appliance 20 can include an inner liner 22 and an outer wrapper 24 that is attached to the inner liner 22. The inner liner 22 and outer wrapper 24 define an insulating structure 26 with an insulating cavity 28 disposed therein. An insulating material 30 is disposed within the insulating cavity 28 that is formed between the inner liner 22 and the outer wrapper 24 and is maintained at an at least partial vacuum 32. In this manner, the inner liner 22, outer wrapper 24 and insulating material 30 form the vacuum insulating structure 26 for the door panel 12. A dispenser structure 10 is defined within a central portion 34 of the inner liner 22 and the outer wrapper 24. The dispenser structure 10 can define an insulated dispenser portion 36 within an interior space of the dispenser structure 10. A dispenser conduit 40 is included within the dispenser structure 10 and extends from an interior area 42 disposed above the dispenser well 18 to an external dispenser well 18. In this manner, the dispenser conduit 40 passes through the insulated dispenser portion 36 of the dispenser structure 10. The interior area 42 disposed above the dispenser well 18 is typically positioned proximate the inner liner 22 and also above the dispenser structure 10 that is attached to the insulating structure 26 of the door panel 12. The dispenser well 18 is positioned proximate the outer wrapper 24 and forms a space that can be conveniently accessed by a user of the refrigerating appliance 20 for receiving dispensed water or ice pieces or for placing a container to be filled with water and/or ice.

Figure 3:
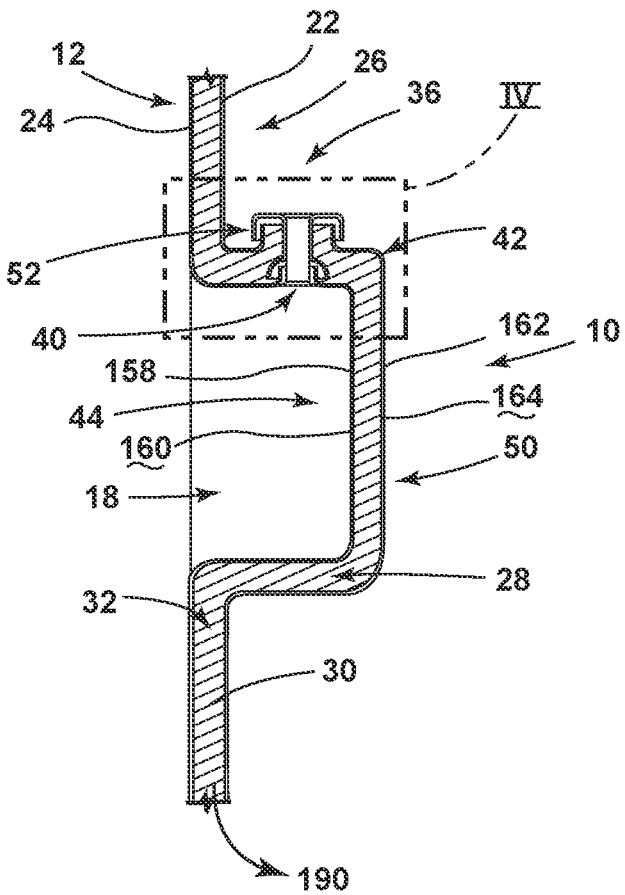
FIG. 3 is a schematic cross-sectional view of a vacuum insulated door structure having a deep drawn section that forms the dispenser structure.
Figure 4:
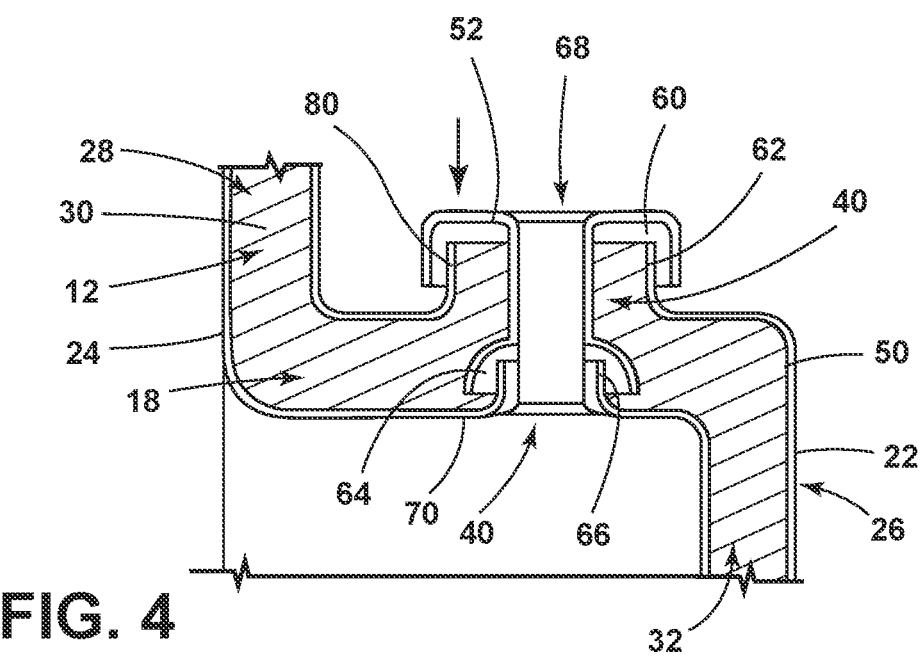
FIG. 4 is an enlarged schematic cross-sectional view of the door structure of FIG. 3 taken at area IV, and showing a trim breaker that forms a dispenser conduit of the dispenser structure.

Referring now to FIGS. 3 and 4, the dispenser well 18 for the insulating structure 26 can include a deep drawn portion 50 of the inner liner 22, the outer wrapper 24 and the insulating cavity 28 defined therebetween. In such an embodiment, the dispenser conduit 40 is defined by an interior trim breaker 52 that is disposed through part of the deep drawn portion 50 of the inner liner 22 and the outer wrapper 24. In this manner, the interior trim breaker 52 extends through the insulating cavity 28 to define the dispenser conduit 40 that extends fully through the insulating structure 26 for the door panel 12. The interior trim breaker 52 is fixedly coupled with each of the inner liner 22 and the outer wrapper 24. Using the interior trim breaker 52, the insulating structure 26 of the door panel 12 can be maintained as a single and continuous insulating cavity 28 that can be maintained at an at least partial vacuum 32. Accordingly, the insulating cavity 28 of the door panel 12 includes the insulated dispenser portion 36 that is defined by the deep drawn portion 50 formed by the inner liner 22 and outer wrapper 24 of the door panel 12.

Referring again to FIGS. 3 and 4, the interior trim breaker 52 can include a liner channel 60 that receives interior liner edges 62 of the inner liner 22. The interior trim breaker 52 can also include a wrapper channel 64 that is configured to receive interior wrapper edges 66 of the outer wrapper 24. In this manner, the interior trim breaker 52 can cooperate with the inner liner 22 and the outer wrapper 24 to seal the conduit opening 68 defined through each of the inner liner 22 and the outer wrapper 24 to form the dispenser conduit 40 for the dispenser structure 10.

According to various aspects of the device, the interior trim breaker 52 can be made of various materials that can include, but are not limited to, plastic, metal, glass, ceramic materials, polymer materials, combinations thereof, and other similar materials that are adapted for maintaining airtight seal or a substantially airtight seal within a structure. It is contemplated that the interior trim breaker 52 can be welded, adhered, attached, or otherwise coupled to each of the inner liner 22 and outer wrapper 24 to form the dispenser conduit 40 within the dispenser structure 10. The interior trim breaker 52 can also be positioned so that the interior trim breaker 52 is located within a top portion 70 of the dispenser well 18 and is substantially concealed by the outer wrapper 24 and also by various components of the dispenser structure 10. These various components can include, but are not limited to, dispenser paddles 72, trim assemblies, light-ing assemblies, or other similar components of a dispenser system 74 for the appliance 20.

Referring again to FIGS. 3 and 4, the dispenser conduit 40 and the interior trim breaker 52 can include various shapes and sizes. By way of example, and not limitation, the interior trim breaker 52 and the dispenser conduit 40 can be round, oval, rectilinear, irregularly shaped, combinations thereof, or other similar shape that can be used to provide for the dispensing of water and ice pieces therethrough. The shape of the dispenser conduit 40 and the interior trim breaker 52 can vary depending upon the configuration of the particular ice making assembly 16 and water dispensing assembly 14 for dispensing of water and ice pieces therethrough. The size of the dispenser conduit 40 and the interior trim breaker 52 can also vary depending upon the configuration of the particular ice making assembly 16 being attached thereto and the size and shape of the ice pieces being delivered therethrough.

Referring again to FIGS. 3 and 4, positioning of the interior trim breaker 52 for attaching to the inner liner 22 and outer wrapper 24 is adapted to conceal most, if not all, of the interior trim breaker 52. In this manner, the outer wrapper 24 can include turned flanges 80 that are directed away from the dispenser well 18. Accordingly, the attachment between the interior trim breaker 52 and the outer wrapper 24 is at least partially defined within the insulating cavity 28 between the inner liner 22 and the outer wrapper 24. Similarly, the inner liner 22 can also include a turned flange 80 that is adapted to engage the liner channel 60 of the interior trim breaker 52. It is contemplated that the turned flange 80 of the inner liner 22 can extend away from the dispenser well 18 or toward the dispenser well 18, depending upon the configuration of the interior trim breaker 52. Where the turned flange 80 of the inner liner 22 is angled toward the dispenser well 18, the interior trim breaker 52 is positioned entirely between, or substantially between, the inner liner 22 and the outer wrapper 24 such that the liner channel 60 and wrapper channel 64 of the interior trim breaker 52 face opposite directions for receiving the turned flanges 80 of the inner liner 22 and outer wrapper 24.

It is also contemplated that the turned flange 80 of the inner liner 22 can be directed away from the dispenser well 18, as illustrated in FIGS. 3 and 4. In such a configuration, the interior trim breaker 52 can be attached to the inner liner 22 and outer wrapper 24 by linearly inserting the interior trim breaker 52 through the opening 122 that forms the dispenser conduit 40. Where the liner channel 60 and wrapper channel 64 of the interior trim breaker 52 are oriented in the same direction, the interior trim breaker 52 can be inserted from above the dispenser well 18 to form a type of plug that seals the transition between the inner liner 22 and outer wrapper 24 to form the dispenser conduit 40. In these configurations, it is contemplated that the interior trim breaker 52 is substantially concealed from view, when viewed from the dispenser well 18.

Figure 5:
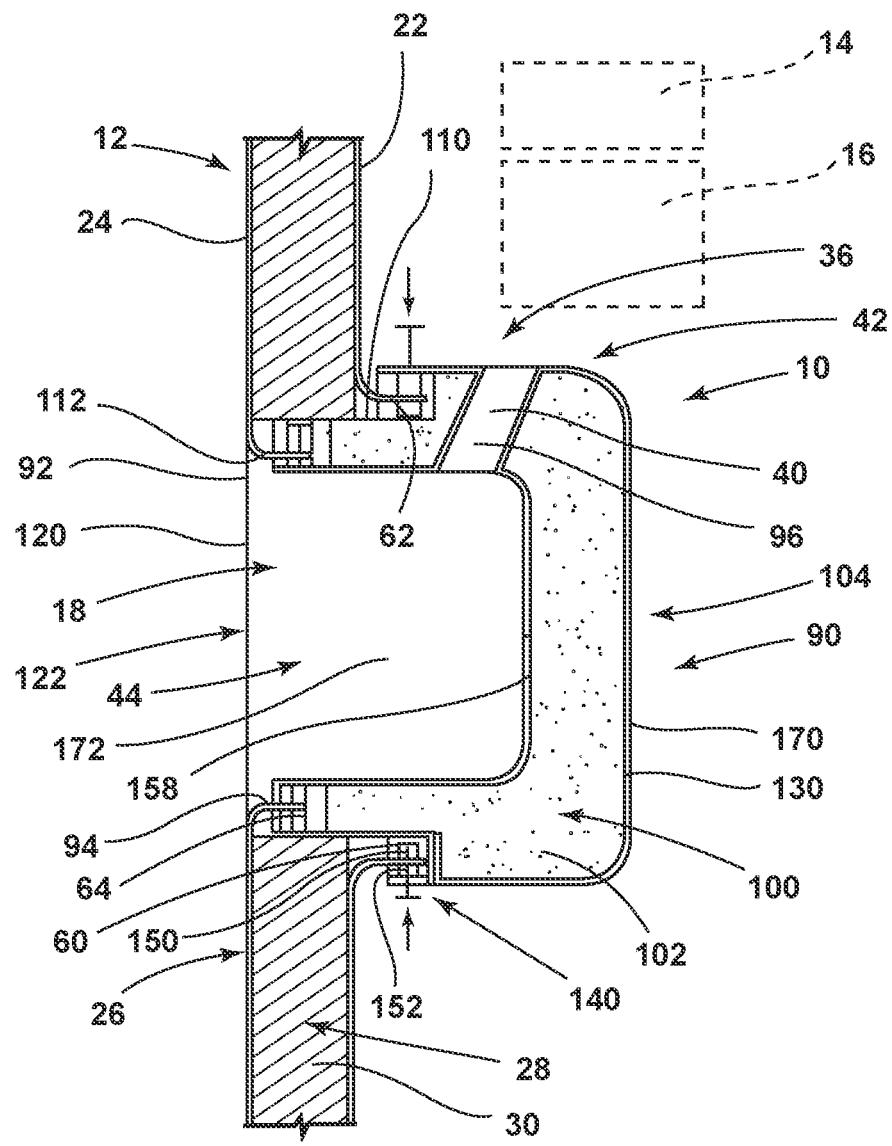
FIG. 5 is a schematic cross-sectional view of a vacuum insulated door structure, and showing the dispenser structure as a separate dispenser assembly that is attached to the main body of the door structure.
Figure 6:
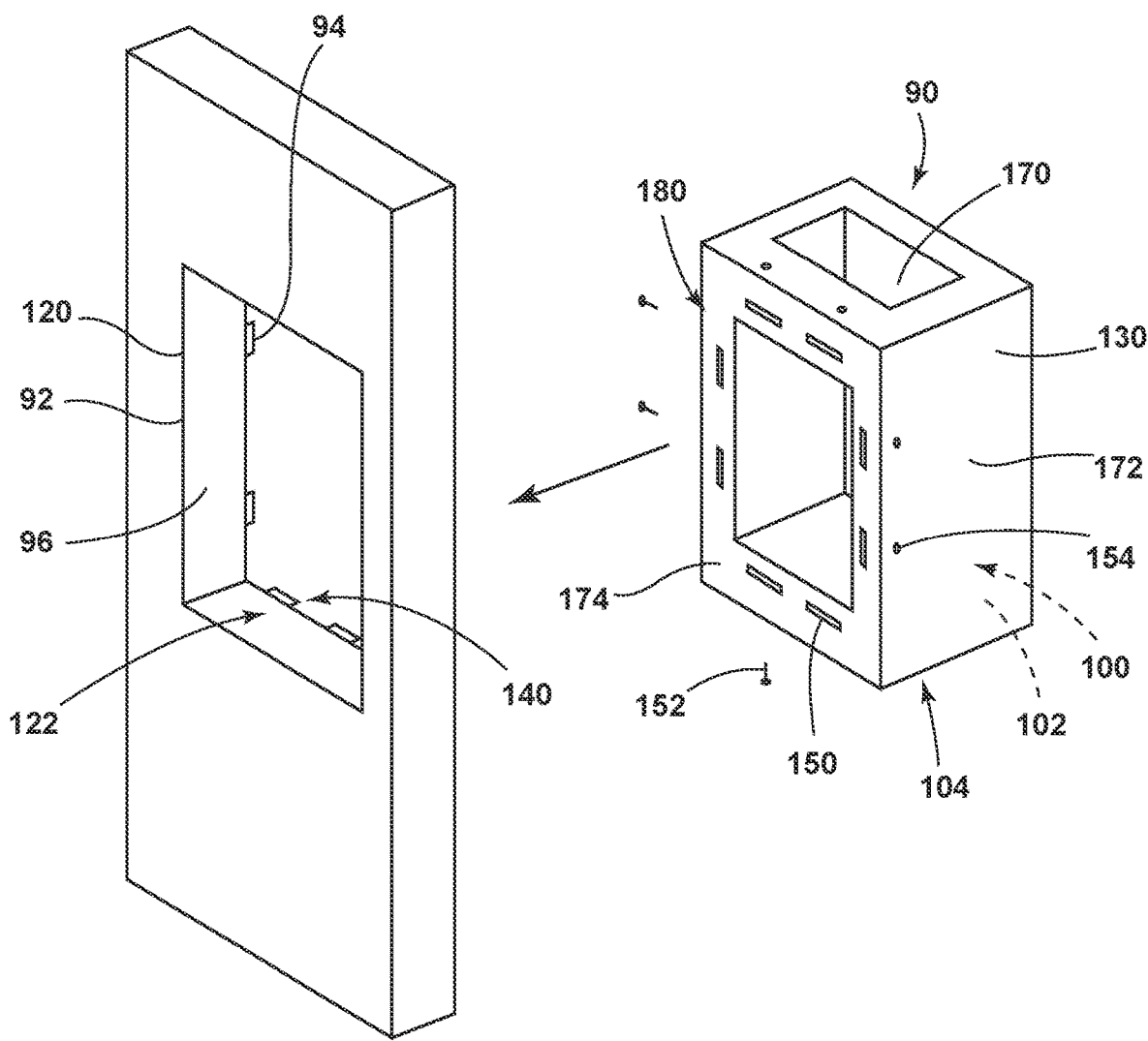
FIG. 6 is a schematic perspective view of an aspect of the separate dispenser assembly being attached to the vacuum insulated door structure.
Figure 7:
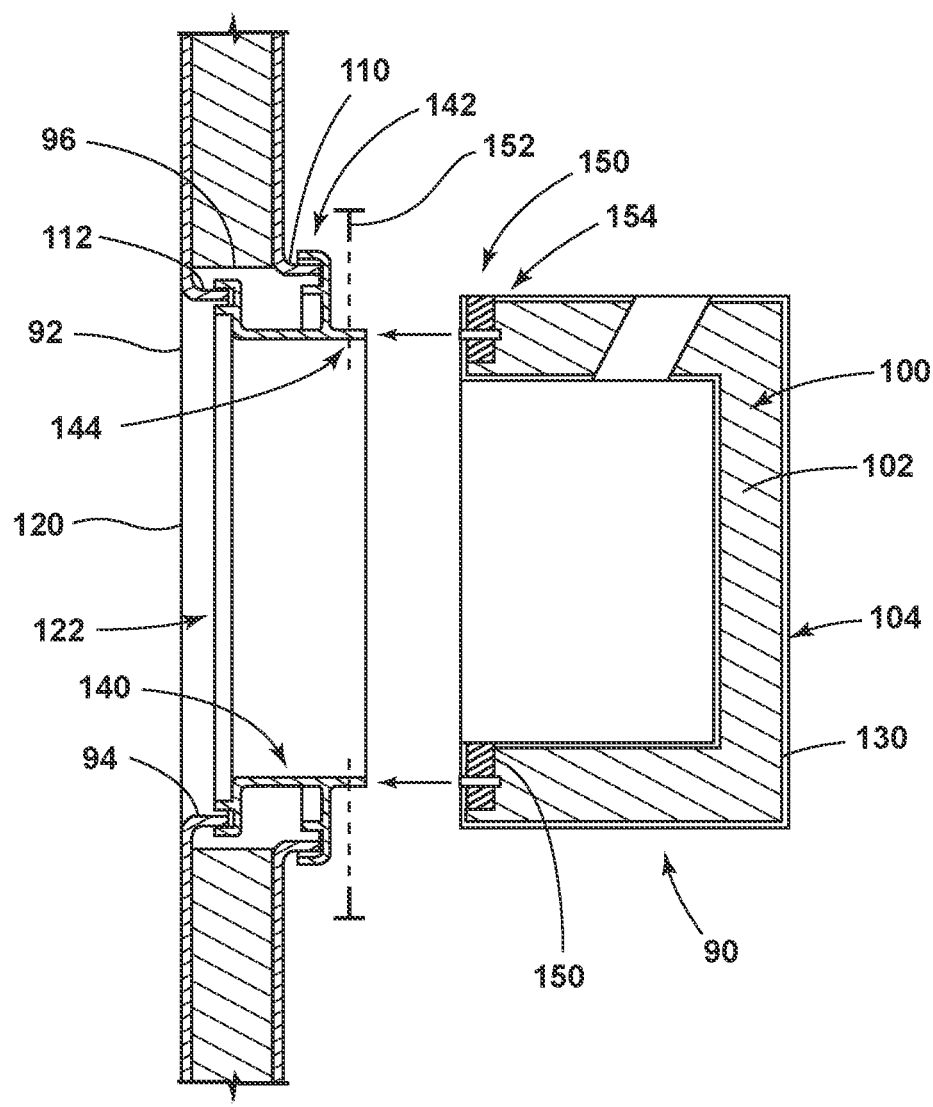
FIG. 7 is a schematic cross-sectional view of an aspect of the separate dispenser assembly being attached to the remainder of the vacuum insulated door structure.
Figure 8:
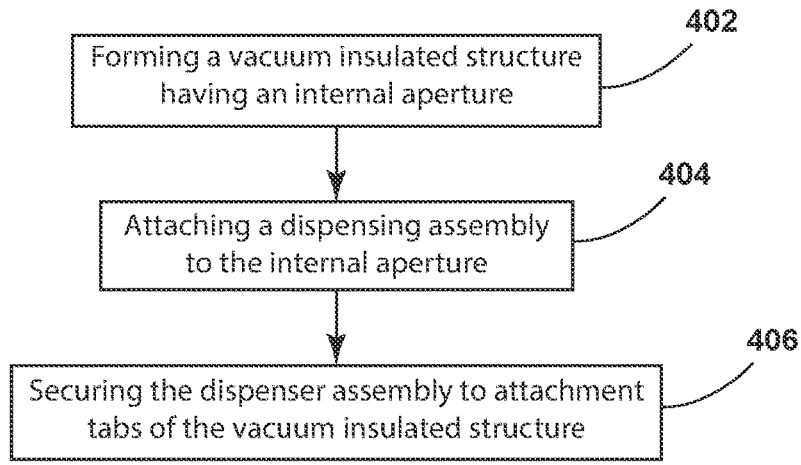
FIG. 8 is a linear flow diagram illustrating a method for forming a door panel having a dispenser structure.
Figure 9:
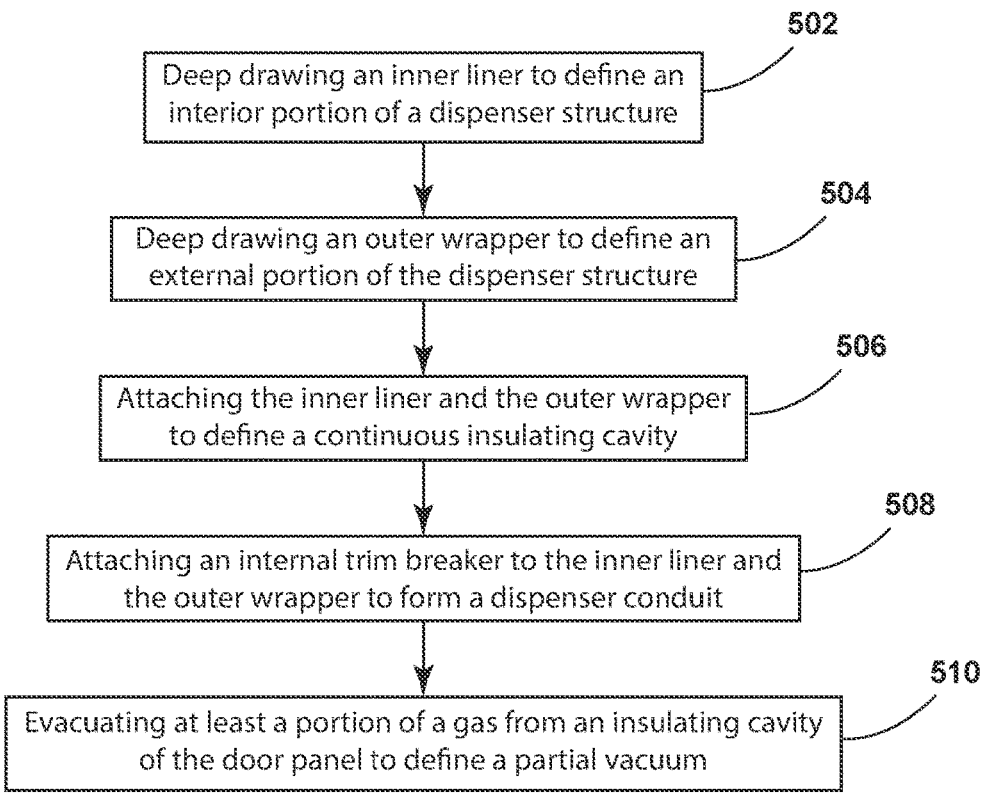
FIG. 9 is a linear flow diagram illustrating a method for forming a door panel having a dispenser structure.

Referring now to FIGS. 5-7, the dispenser structure 10 for the door panel 12 can be in the form of a separate dispenser assembly 90 that is attached to the central portion 34 of the inner liner 22 and the outer wrapper 24. In such an embodiment, the dispenser assembly 90 includes the dispenser conduit 40 therein. The inner liner 22 and outer wrapper 24 cooperatively define an aperture 92 within the central portion 34. The aperture 92 includes at least one attachment tab 94 that couples with the dispenser assembly 90 to define the dispenser well 18 and form the dispenser structure 10 for the door panel 12. It is contemplated that the dispenser assembly 90 can attach to or connect with the at least one attachment tab 94 via a mechanical fastener 152 such as a bolt, screw, rivet, tab, clasp, or other similar mechanical attachment feature 180. The insulating structure 26 of the door panel 12 can also include an interior breaker member 96 that separates the insulating cavity 28 from the attachment tabs 94.

Referring again to FIGS. 5-7, the dispenser assembly 90 that attaches to the inner liner 22 and outer wrapper 24 at the aperture 92 within the central portion 34 of the door panel 12 can include a supplemental interior cavity 100 that includes a supplemental insulating material 102 disposed therein. In this manner, the dispenser assembly 90 can form a separate self-contained and insulated module 104 that can be mechanically fastened to the door panel 12 at the various attachment tabs 94 of the insulating structure 26.

The separate dispenser assembly 90 can include a foam-type insulation as the supplemental insulating material 102. It is also contemplated that the dispenser assembly 90 can be a separate vacuum insulated structure having the supplemental interior cavity 100 that is maintained at an at least partial vacuum 32.

Referring again to FIGS. 5-7, the various attachment tabs 94 of the insulating structure 26 for the door panel 12 can include at least one liner attachment tab 110 that extends from the inner liner 22 and at least one wrapper attachment tab 112 that extends from the outer wrapper 24. The liner and wrapper attachment tabs 112 can include a single perimetrical flange that extends around the aperture 92 defined within the central portion 34 of the door panel 12. It is also contemplated that the liner attachment tab 110 can include a plurality of separate attaching members that are placed about the aperture 92 and extend from the inner liner 22. Similarly, the wrapper attachment tabs 112 can include a plurality of individual members that extend from the outer wrapper 24 and allow for attachment of the dispenser assembly 90 within the aperture 92 of the door panel 12. In attaching the separate dispenser assembly 90 to the attachment tabs 94 of the door panel 12, a seal or gasket can be disposed between these members to create a seal between the dispenser assembly 90 and the door panel 12. The seal or gasket can define a physical seal and a thermal seal that substantially prevents infiltration of fluid and heat through the door panel 12.

Referring again to FIGS. 1-7, the door panel 12 for the refrigerating appliance 20 can include the inner liner 22 that is coupled with the outer wrapper 24 to define the insulating cavity 28 therein. An interior perimeter 120 is defined at least within the outer wrapper 24. This interior perimeter 120 is configured to define an opening 122 for the dispenser well 18 of the dispenser structure 10. An insulating material 30 is defined within the insulating cavity 28 and the insulating cavity 28 is typically maintained at an at least partial vacuum 32. The dispenser structure 10 is disposed proximate to the interior perimeter 120 and the dispenser structure 10 defines an insulated dispenser portion 36 therein. This insulated dispenser portion 36 is defined by the interior areas 42 of the dispenser structure 10 defined between the outer structural members of the dispenser structure 10.

In the case of the deep-drawn configuration of the door panel 12, exemplified in FIGS. 3 and 4, the insulated dispenser portion 36 is integral with the remainder of the insulating cavity 28 of the door panel 12.

In the aspects of the device exemplified in FIGS. 5-7, where the dispenser assembly 90 is attached, mechanically, to the remainder of the door panel 12 at the aperture 92, the insulated dispenser portion 36 is defined within an outer enclosure 130 of the dispenser assembly 90. Within this outer enclosure 130, the supplemental insulating material 102 is disposed therein to define the insulated dispenser structure 10. The dispenser structure 10 also includes the external dispensing cavity 44, such as the dispenser well 18, that is defined within the interior perimeter 120, and extends rearward of the interior perimeter 120 within the door panel 12. For accessing the external dispensing cavity 44 or dispenser well 18, a user of the appliance 20 will reach through the interior perimeter 120 and into the dispenser well 18 for engaging the various dispensing functions of the appliance 20. The dispenser conduit 40 extends from an interior area 42 disposed above the dispenser structure 10 to the external dispensing cavity 44 or dispenser well 18. In this manner, the dispenser conduit 40 passes through the insulated dispenser portion 36 of the dispenser structure 10.

Referring again to FIGS. 1, 2 and 5-7, the interior perimeter 120 is configured to define an internal aperture 92 through which the dispenser well 18 is accessed by a user during operation of the appliance 20. In various aspects of the device, an attachment structure 140, typically including the various attachment tabs 94, is used to attach the dispenser assembly 90 to the remainder of the door panel 12 via the attachment structure 140. This attachment structure 140 can be integral with the inner liner 22 and outer wrapper 24 to form the various liner attachment tabs 110 and wrapper attachment tabs 112. It is also contemplated that the attachment structure 140 can be a separate retaining assembly 142 (shown in FIG. 7) that is disposed within the aperture 92 and can be coupled to each of the inner liner 22, the outer wrapper 24 and various portions of the dispenser assembly 90. As discussed above, the attachment structure 140 can include the various fastening portions 144 that allow for connection between the door panel 12 and the dispenser structure 10 or dispenser assembly 90 via mechanical fasteners 152. In various aspects of the device the attachment structure 140 can include a magnetic attachment mechanism. In such an embodiment, the dispenser assembly 90 can be attached to, connected with or otherwise coupled to the door panel 12 via a plurality of magnetic members or a combination of magnetic members and ferromagnetic members.

Referring again to FIGS. 5-7, the attachment structure 140 includes various fastener receptacles 150 that are configured to receive the fasteners 152 for attaching the dispenser assembly 90 to the attachment tabs 94. These fastener receptacles 150 are configured to receive the mechanical fasteners 152, and at the same time, are configured to maintain each of the fasteners 152 separate from the insulating cavity 28 of the door panel 12 and, where included, the separate dispenser assembly 90. In this manner, the fastener receptacles 150 can be in the form of attachment portions having internal openings 154 that are configured to receive the mechanical fasteners 152. These internal openings 154 also hold the mechanical fasteners 152 in a predefined location and prevent puncture infiltration, or other undesirable movement of the various fasteners 152 into the insulating cavity 28 in the door panel 12 or the supplemental interior cavity 100 of the dispenser assembly 90, where included.

Referring again to FIGS. 3-7, the dispenser structure 10 that at least partially forms the dispenser well 18 includes an external portion 158 for defining the external dispensing cavity 44 or dispenser well 18. According to various aspects of the device, this external portion 158 that defines the external dispensing cavity 44 can be in the form of the outer wrapper 24. In this manner, the outer wrapper 24, in the deep-drawn configuration, can be a single continuous piece that defines the front surface 160 of the door panel 12. Similarly, the dispenser structure 10 can include an internal portion 162 that at least partially defines the interior area 42 disposed above the dispenser structure 10. In various embodiments, the internal portion 162 is a portion of the inner liner 22. Again, in such an embodiment, the inner liner 22 can be a deep-drawn member that forms a single and continuous piece that defines the interior surface 164 of the door panel 12. These deep-drawn members, in the form of the inner liner 22 and outer wrapper 24 can be connected together and the dispenser conduit 40 can be attached at the dispenser conduit 40 by the interior trim breaker 52.

Referring now to FIGS. 1-8, having described various aspects of the dispenser structure 10 for the door panel 12 of the appliance 20, a method 400 is disclosed for forming a door panel 12 for an appliance 20. The method 400 can include a step 402 for forming a vacuum insulated structure having the inner liner 22 and the outer wrapper 24. In forming this vacuum insulated structure, the inner liner 22 and outer wrapper 24 are sealed to form a sealed internal aperture 92 that extends through the inner liner 22 and the outer wrapper 24. This internal aperture 92 is typically positioned within a central portion 34 of the door panel 12. It is contemplated that the central aperture 92 can also be positioned in an offset configuration toward one of the edges of the door panel 12 or can be placed within the central portion 34 of the door panel 12 itself. After forming the vacuum insulated structure, the dispenser structure 10 is attached to the vacuum insulated structure at the sealed internal aperture 92 (step 404). The sealed internal aperture 92 includes a plurality of attachment tabs 94 that extend from the inner liner 22, the outer wrapper 24, or each of the inner liner 22 and outer wrapper 24. The dispenser structure 10 is then secured to the plurality of attachment tabs 94 via mechanical fasteners 152 (step 406). As discussed above, where the plurality of attachment tabs 94 include various fastener receptacles 150 that receive corresponding fasteners 152, the fastener receptacles 150 maintain each corresponding fastener 152 separate from the insulating cavity 28 of the vacuum insulating structure 26. Accordingly, these fastener receptacles 150 serve to prevent punctures or other damage to the door panel 12 that might cause an infiltration of gas 190 into the insulating cavity 28.

Referring to FIG. 5, the fastener receptacles 150 can be disposed within an area defined between the inner liner 22 and outer wrapper 24, and also between the members of the outer enclosure 130 for the dispenser assembly 90. When the dispenser assembly 90 is attached to the inner liner 22 and outer wrapper 24, the fastener receptacles 150 may be at least partially positioned between this interface. It is also contemplated that the fastener receptacles 150 can be positioned near the inner liner 22 so that these fastener receptacles 150 are substantially concealed by various trim members, or the various dispenser assemblies of the appliance 20. The various fastener receptacles 150 are designed to not be shown within the dispenser well 18 during use of the appliance 20.

As exemplified in FIG. 5, the dispenser assembly 90 includes a wrapper channel 64 and a liner channel 60 that at least partially surrounds the interior wrapper edge 66 and the interior liner edge 62 of the outer wrapper 24 and inner liner 22, respectively. The fastener receptacles 150 can be at least partially disposed within the wrapper channel 64 and liner channel 60 of the dispenser assembly 90. This placement of the fastener receptacles 150 serves to at least partially conceal the fastener receptacle 150 and the mechanical fastener 152 disposed therein. The fastener receptacles 150 can also be integrally formed into the inner liner 22, the outer wrapper 24, or the dispenser assembly 90.

As exemplified in FIG. 6, the dispenser assembly 90 can include an enclosure having a back wall 170, four side walls 172 and a front wall 174. The fastener receptacle 150 can be positioned within a portion of a front wall 174 and the dispenser conduit 40 in the position from the top wall. The dispenser conduit 40 may also be located in the back wall 170 or one of the side walls 172. The dispenser assembly 90, in this configuration, can form a substantially self-contained dispenser assembly 90 that can be attached to the various attachment tabs 94 of the door panel 12 through the use of the fastener receptacles 150.

In various aspects of the device, as exemplified in FIGS. 1, 2 and 5-7, various components of the dispenser systems 74 for the appliance 20 can be incorporated within the dispenser assembly 90. By way of example, and not limitation, the dispenser assembly 90 may include attachment features 180 for connecting a water dispensing assembly 14, an ice making assembly 16, the various operating paddles 72, a user interface 182, and other similar mechanisms that are typically attached proximate the dispenser well 18 of an appliance 20. It is also contemplated that the dispenser assembly 90 can include an integrated ice making assembly 16, various water dispensing assemblies 14, paddles 72, and other dispensing features of the various dispensing systems for the appliance 20. In such an embodiment, the dispenser assembly 90 can be attached to the remainder of the door panel 12 as a self-contained unit. During final manufacture, electrical wiring, data cabling, fluid lines, and other similar services can be attached to the dispenser assembly 90 for making the dispenser assembly 90 operational during use.

Referring now to FIGS. 1-7 and 9, having described various aspects of the device, a method 500 is disclosed for forming a door panel 12 of an appliance 20. This method 500 can include step 502 of deep drawing an inner liner 22 to define an interior portion of a dispenser structure 10. Step 504 can include deep drawing an outer wrapper 24 to define an external portion 158 of the dispenser structure 10. The inner liner 22 and outer wrapper 24 can be attached together to define a continuous insulating cavity 28 for the door panel 12 (step 506). In such an embodiment, the continuous insulating cavity 28 also extends through the dispenser structure 10. According to the method 500, an internal trim breaker can be attached to the inner liner 22 and outer wrapper 24 to form a dispenser conduit 40 through the dispenser structure 10 (step 508). The interior trim breaker 52 is configured to extend between the interior and exterior portions of the dispenser structure 10. In this manner, the interior trim breaker 52 is attached to each of the inner liner 22 and outer wrapper 24 for the door panel 12. According to the method 500, at least a portion of the gas 190 from the continuous insulating cavity 28 is evacuated to define a vacuum insulating structure 26 (step 510). This vacuum insulating structure 26 extends through the entire interior insulating cavity 28, including the supplemental interior cavity 100 of the dispenser structure 10. In such an embodiment, the insulating cavity 28 is defined by the inner liner 22, the outer wrapper 24 and the interior trim breaker 52.

According to various aspects of the device, the dispenser structure 10 that is attached to the door panel 12 can be incorporated within various appliances 20. Such appliances 20 can include, but are not limited to, refrigerators, freezers, laundry appliances, dishwashers, ovens, small appliances, and other similar residential and commercial appliances and fixtures.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A door panel for a refrigerating appliance, the door panel comprising:
   an inner liner;
   an outer wrapper attached to the inner liner and defining an insulating structure with an insulating cavity disposed therein;
   an insulating material defined within the insulating cavity;
   a dispenser structure defined within a portion of the inner liner and the outer wrapper, wherein the dispenser structure defines an insulated dispenser portion therein, wherein the insulating cavity is a single and continuous cavity that extends between the inner liner and the outer wrapper and through the insulated dispenser portion of the dispenser structure; and
   a dispenser conduit defined by an interior trim breaker that extends from an interior area disposed above the dispenser structure to an external dispensing cavity and passing through the insulated dispenser portion, wherein the inner liner and the outer wrapper includes a deep-drawn portion that defines the dispenser structure, wherein the inner liner and the outer wrapper each include a respective upturned flange that is directed away from the external dispensing cavity, the dispenser conduit having a liner channel that engages the respective upturned flange of the inner liner and a wrapper channel that engage the respective upturned flange of the outer wrapper, and wherein the wrapper channel has a diameter that is smaller than the respective upturned flange of the inner liner to pass through the inner liner and engage the respective upturned flange of the outer wrapper within the insulating cavity.

2. The door panel of claim 1, wherein the interior trim breaker is fixedly coupled with the inner liner and the outer wrapper at the dispenser structure.

3. The door panel of claim 2, wherein the interior trim breaker is disposed within the deep-drawn portion of the inner liner and the outer wrapper.

4. The door panel of claim 1, wherein the insulating cavity is further defined by the interior trim breaker, and wherein the insulating cavity includes the insulated dispenser portion.

5. The door panel of claim 1, wherein the insulating cavity defines an at least partial vacuum.

6. The door panel of claim 1, wherein the dispenser structure includes an external portion that at least partially defines the external dispensing cavity.

7. The door panel of claim 6, wherein the external portion is defined by the outer wrapper.

8. The door panel of claim 1, wherein the dispenser structure includes an internal portion that at least partially defines the interior area disposed above the dispenser structure, and wherein the internal portion is defined by the inner liner.

* * * * *